(12) United States Patent
Soles et al.

(10) Patent No.: US 7,720,996 B2
(45) Date of Patent: May 18, 2010

(54) INTERNET PROTOCOL (IP) ADDRESS PROXIMITY AND APPLICATION TO PEER PROVIDER LOCATION

(75) Inventors: L. Roger Soles, San Francisco, CA (US); Xavier Boyen, Stanford, CA (US); Dan Teodosiu, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1807 days.

(21) Appl. No.: 09/908,782

(22) Filed: Jul. 18, 2001

(65) Prior Publication Data

US 2002/0143918 A1    Oct. 3, 2002

Related U.S. Application Data

(60) Provisional application No. 60/279,225, filed on Mar. 27, 2001.

(51) Int. Cl.
  G06F 15/16    (2006.01)
  G06F 15/173    (2006.01)
(52) U.S. Cl. .................................. 709/245; 709/238
(58) Field of Classification Search ......... 709/223–226, 709/238–244, 245, 217–219, 203
  See application file for complete search history.

(56) References Cited

U.S. PATENT DOCUMENTS

| | | | |
|---|---|---|---|
| 5,724,510 A |   | 3/1998 | Arndt et al. |
| 5,922,049 A |   | 7/1999 | Radia et al. |
| 6,006,264 A | * | 12/1999 | Colby et al. ............... 709/226 |
| 6,178,455 B1 |   | 1/2001 | Schutte et al. |
| 6,295,298 B1 |   | 9/2001 | Hrastar et al. |
| 6,314,465 B1 | * | 11/2001 | Paul et al. ................... 709/226 |
| 6,374,289 B2 | * | 4/2002 | Delaney et al. ............. 709/203 |
| 6,618,755 B1 | * | 9/2003 | Bonn ........................... 709/223 |
| 6,785,704 B1 | * | 8/2004 | McCanne .................... 718/105 |
| 6,973,485 B2 | * | 12/2005 | Ebata et al. ................. 709/219 |
| 7,089,301 B1 | * | 8/2006 | Labio et al. ................. 709/224 |
| 2001/0056416 A1 | * | 12/2001 | Garcia-Luna-Aceves ....... 707/2 |
| 2002/0163882 A1 | * | 11/2002 | Bornstein et al. ........... 370/227 |

(Continued)

FOREIGN PATENT DOCUMENTS

WO    WO 9857275 A2 * 12/1998

OTHER PUBLICATIONS

International Search Report for WO 02/078285 A3.*

(Continued)

*Primary Examiner*—Yasin Barqadle

(57) ABSTRACT

Internet Protocol (IP) address assignment information is collected from Address Allocation Tables (AATs) of a plurality of IP address assigning registrars. The information is processed and stored into one or more data structures. The information is accessed to determine a proximity measure for any two given IP addresses. In one embodiment, the proximity determination includes the determination of superblock memberships of the IP addresses, comparison of the assigning registrars, as well as the location countries of the IP addresses. In one embodiment, the proximity detection is applied to locating IP addresses of peer providers of a resource. In one embodiment, Autonomous System (AS) numbers and IP addresses for a plurality of peer providers for a plurality of resources are also collected and organized into one or more data structures; this organized information of the peer providers is also used in locating the closest peer providers of a resource in terms of network topology.

25 Claims, 12 Drawing Sheets

U.S. PATENT DOCUMENTS

2004/0215693 A1* 10/2004 Thompson .................. 709/201
2004/0215756 A1* 10/2004 VanAntwerp et al. ....... 709/223
2005/0201302 A1*  9/2005 Gaddis et al. ............... 370/254

OTHER PUBLICATIONS

SONAR—A Network Proximity Service Version 1, Keith Moore, Aug. 4, 1998.*

Border Gateway Protocol (BGP), printed from the Mar. 11, 2000 archive of <http://www.cisco.com/universecd/cc/td/doc/cisintwk/ito_doc/bgp.pdf>.*

Network Working Group, Request for Comments: 1771, Rekhter et al., Mar. 1995.*

* cited by examiner

INTERNET PROTOCOL (IP) ADDRESS PROXIMITY AND APPLICATION TO PEER PROVIDER LOCATION

RELATED APPLICATION

This application claims priority to provisional application No. 60/279,225, entitled "A system and method for Internet Protocol (IP) Address Proximity Detection", filed on Mar. 27, 2001.

BACKGROUND OF THE INVENTION

1. Field of the Invention

The present invention relates to the field of networking. More specifically, the present invention relates to methods and systems associated with detecting the proximity of IP (Internet Protocol) addresses, and their applications to locating peer providers of resources.

2. Background Information

Recent advances in broadband technology are prompting a shift from the established client-server model of the Word Wide Web to a paradigm in which end-user machines can interact directly with each other. In this new model, called peer-to-peer computing, interactions between users are no longer constrained to go through a centralized server, but can take place directly between the end-user machines themselves.

Interactions that are better carried out in a peer-to-peer fashion include the transfer of large volumes of data (such as images, music files, or video clips) or highly volatile information (such as documents being edited by several people at once), and distributed applications that run on multiple end-user machines (such as real-time distributed games). Peer-to-peer computing enables three novel aspects that are not supported by the World Wide Web:

Frictionless publishing of content. In a peer-to-peer system, every peer machine is both a consumer and a publisher of information. Publishing information in such a system can be as easy as creating a new file.

Low barrier to revision and synchronization. Published files can be edited and updated by their author or any person having write permission on the file, either on the local machine or remotely.

Active role of peer machines. While on the World Wide Web user machines are mainly passive participants, in a peer-to-peer environment those machines can become an active part of distributed applications that span many peers. For instance, any participant machine that has a cached copy of a particular document can supply that document in lieu of the publisher.

One of the most promising benefits of the peer-to-peer model is the ability to seamlessly "cache" resources on multiple machines, both to provide robustness against one particular source of content going off-line, and to maximize the download performance by transparently selecting the fastest and closest possible source(s) of a download and by striping across multiple "equivalent" sources, i.e., downloading multiple fragments (or stripes) of the same file from several sources at once.

Thus, one of the problems faced by such peer-to-peer infrastructure is to be able to find the sources of a given content that are the "closest" to a given target in terms of Internet topology, in order to maximize bandwidth and minimize latency. This contrasts with the vast majority of services based on the client-server model, or even peer-to-peer services like Napster that do not keep track of equivalent copies of resources, where the problem is to find the best route between two fixed locations (the server and the client). In the present case where a multiplicity of sources of identical content can be chosen from, the question of interest is to find the best source or sources, rather than the best route. Thus, a need exists to solve the two related problems of: (i) determining the "proximity" in terms of Internet topology between any two given IP addresses; and (ii) determining a set of most proximal sources to a given target, in terms of network topology.

The difficulty of the problem stems from the fact that it is in general not possible to have exact knowledge of the network topology, in particular of the topology of the network below the level of Autonomous Systems (ASs). Thus, an approximate method is needed that is both fast and, in most cases, accurate enough, to solve the two problems mentioned above.

A related, but different, problem is solved by the Border Gateway Protocol (BGP), which is used by routers to compute the best route between two published networks. Unfortunately, BGP alone is not efficient for determining the proximity of any two arbitrary nodes. Some of the limitations of BGP are the following:

BGP route determination between two arbitrary addresses requires a number of BGP feeds from various locations to accurately compute the hops between the two networks involved.

BGP contains no information on the internal structure of networks, only the links between them, that is, BGP only provides information between the "edges" of public networks.

BGP information is expensive in terms of resources to gather and process.

SUMMARY OF THE INVENTION

IP address assignment information is collected from Address Allocation Tables (AATs) of a plurality of IP address assigning registrars. The information is processed and stored into one or more data structures. The information is accessed to determine a proximity measure for two IP addresses. In one embodiment, the proximity determination includes the determination of superblock memberships of the IP addresses, comparison of the assigning registrars, as well as the location countries of the IP addresses.

In one embodiment, the proximity detection is applied to locating IP addresses of peer providers of resources. In one embodiment, Autonomous System (AS) numbers and IP addresses for a plurality of peer providers for a plurality of resources are also collected and organized into one or more data structures; this organized information of the peer providers is also used in locating the "closest" peer providers of a resource in terms of network topology.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

As summarized earlier, the present invention includes improved methods and related apparatuses for detecting the proximity of two IP addresses, and its application to locating the "closest" peer providers of resources based on network topology. "Closest", in the context of present application, is a qualitative attribute of the relative network distance between two peer providers as seen by the methodology of the present invention, which may or may not correspond in absolute distance to either the shortest physical distance, the smallest number of network hops, the shortest network latency, or any other similar measure.

In the description to follow, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without some of the specific details. In other instances, well known features are omitted or simplified in order not to obscure the present invention.

Parts of the description will be presented in terms of operations performed by a processor based device, using terms such as data, tables, requesting, determining, organizing, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical, and optical components of the processor based device. The term "processor" includes microprocessors, micro-controllers, digital signal processors, and the like, that are standalone, adjunct or embedded.

Various operations will be described as multiple discrete steps in turn, in a manner that is most helpful in understanding the present invention. However, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
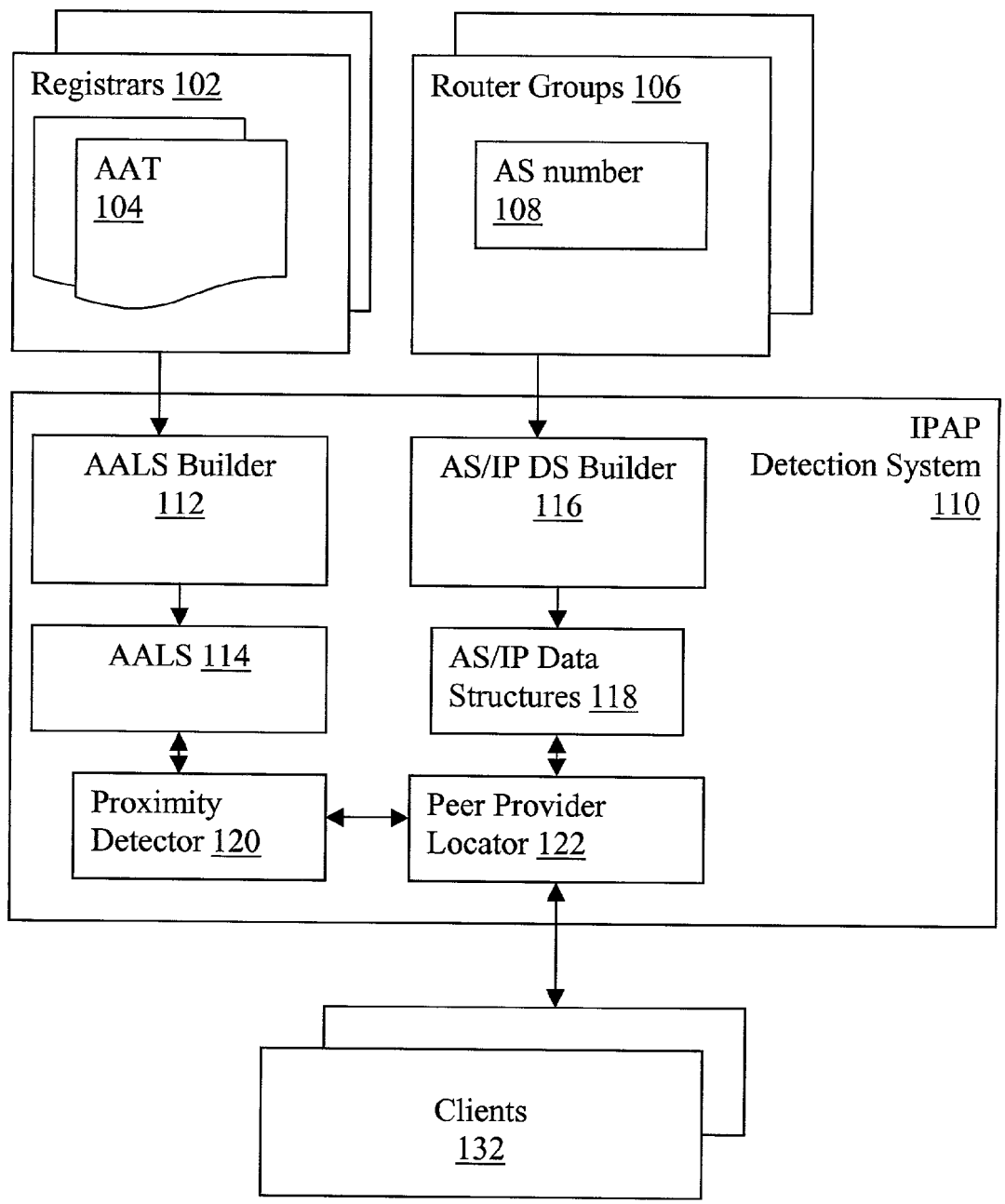
FIG. 1 illustrates an overview of the present invention, in accordance with one embodiment.

Referring now first to FIG. 1, wherein a block diagram illustrating an overview of the present invention, in accordance with one embodiment, is shown.

As illustrated, IPAP detection system 110 of the present invention includes AALS builder 112 and proximity detector 120. As will be explained in more detail below, AALS builder 112 accesses and retrieves IP address assignment information from IP address assigning registrars 102, and builds AALS data structures 114, for use during operation by proximity detector 120, to quickly and efficiently detect the proximity of any two given IP addresses.

For the illustrated embodiment, IPAP detection system 110 also includes Autonomous System AS/IP data structure builder 116 and peer provider locator 122. As will be also described in more detail below, AS/IP data structure builder 116 builds up AS/IP data structures 118 based on AS and IP addresses of peer providers of various resources of interest, for use during operation by peer provider locator 122 to locate and provide a client (such as one of clients 132) with a list of proximally located peer providers of any given resource of interest, including the locations, more specifically, the IP addresses of the peer providers. Peer provider locator 122 advantageously utilizes proximity detector 120 in detecting the proximity of two IP addresses.

As will be readily apparent from the descriptions to follow, registrars 102, including AATs 104 contained therein, and router groups 106, including AS numbers 108 contained therein, all represent a broad range of such elements known in the art. Similarly, except for the teachings of the present invention incorporated therein, clients 132 also represent a broad range of such elements, including but are not limited to, wireless palm sized personal devices (such as wireless mobile phones, pagers, personal digital assistants (PDAs)), notebook computers, desktop computers, set-top boxes, servers (such as compute servers, and file servers), network appliances, network attached storage, and so forth. IPAP detection system 110 may be implemented on one or more servers.

The various elements are communicatively coupled to each other through interconnected public networks, such as the Internet, and communicate with each other using the IP (although some of the elements may be coupled to each other via private networking connection and/or utilizing proprietary communication protocols).

AALS Data Structure Builder

Figure 2:
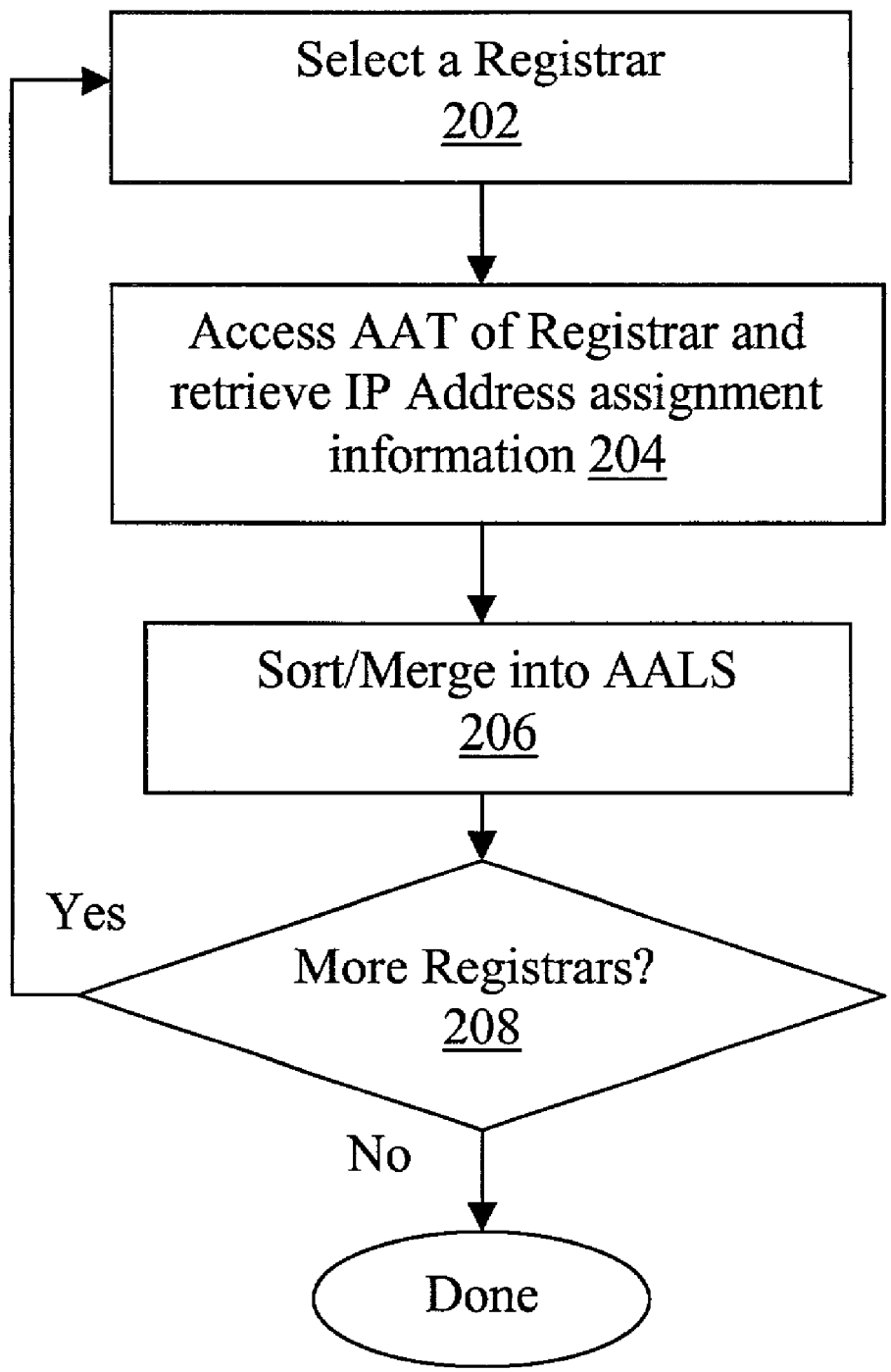
FIG. 2 illustrates the operational flow of the relevant aspects of the Allocated Address Lookup Structure (AALS) builder of FIG. 1, in accordance with one embodiment.

Referring now to FIG. 2, wherein a block diagram illustrating the operational flow of the relevant aspects of AALS Builder 112 of FIG. 1, in accordance with one embodiment, is shown. As illustrated, upon invocation, AALS builder 112 selects an IP address assigning registrar, block 202, and accesses its AAT to retrieve IP address assignment information from the registrar, block 204. In particular, in addition to the registrar's identifier, AALS builder 112 retrieves information about all superblocks of IP addresses (hereinafter, simply called superblocks) assigned by the registrar. For each superblock, AALS builder 112 retrieves the country identifications for the countries within which the superblock addresses reside, and the community identifier of the superblock.

In turn, AALS builder 112 sort/merges the retrieved superblocks of IP addresses, based on their base block IP addresses, into MLS 114, block 206, for subsequent use by proximity detector 120 in detecting or determining the proximity of two IP addresses.

The operations of blocks 202-206 are repeated for all known registrars, until eventually, it is determined in block 208, that all known registrars have been accessed, and their address assignment information have been retrieved and stored into AALS 114.

In various embodiments, the MLS data structure can be built by merging the information as it is retrieved, or by batch-sorting the information after all information has been retrieved. Further, as registrars change or make new IP address assignments from time to time, the presently preferred embodiment repeats the above described AALS building process from time to time. The frequency of repetition is dependent on the accuracy desired for the proximity detection process. Preferably, the frequency is configurable by the service provider hosting IPAP detection system 110. Such configuration may be effectuated via any one of a number of user configuration techniques known in the art.

AALS Data Structure

In a first embodiment, AALS 114 is simply formed by arranging the superblocks in accordance with their base addresses. The data structure may be subsequently accessed using a "binary search" strategy.

Figure 3A:
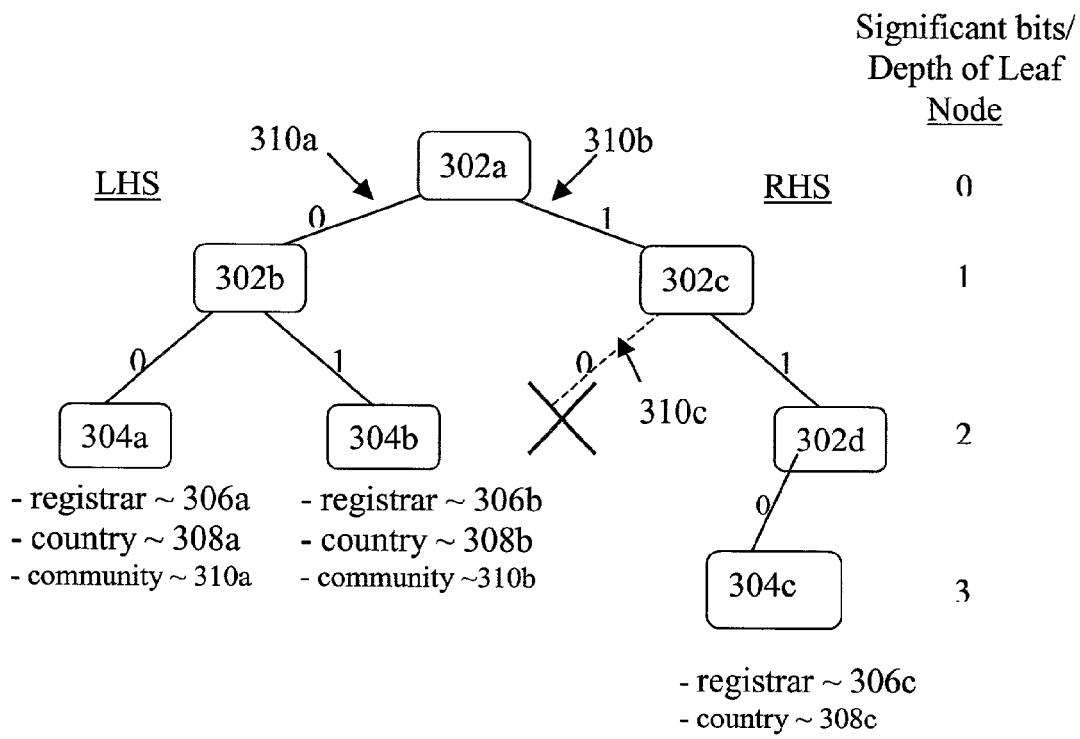
FIGS. 3a-3b illustrate two example data structures suitable for use to implement the AALS of FIG. 1, in accordance with one embodiment.
Figure 3B:
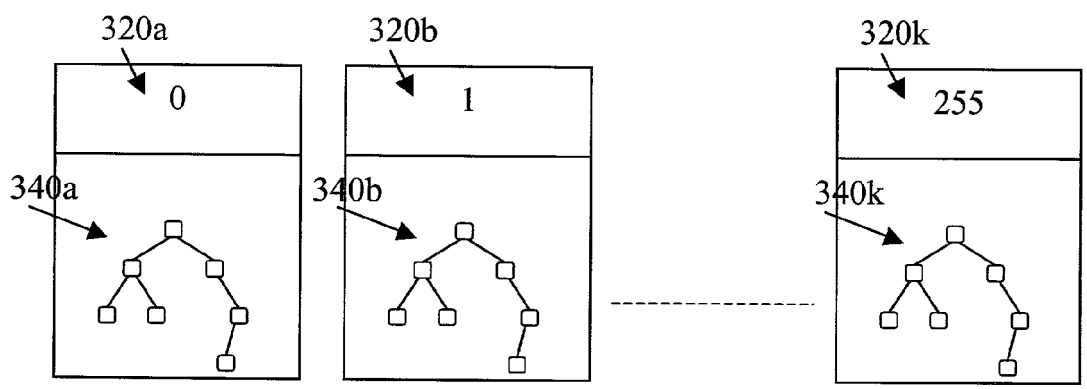

FIGS. 3a-3b illustrate two alternative data structures also suitable for use to store the retrieved address assignment information in an organized manner, to facilitate efficient proximity detection. As illustrated in FIG. 3a, for the embodiment, the retrieved address assignment information is stored and organized in a "prefix tree" data structure, with the registrar, country, and community information 306a-310a of each superblock of IP addresses being stored at a "leaf node" location of the "prefix tree" data structure. The "leaf node" location is determined by the values of the significant bits of the IP addresses of the superblock, starting with the most significant bit from the root. Thus, the number of most significant bits that uniquely distinguishes a given superblock from any other superblock stored in the AALS, also determines the depth level of the "leaf node" corresponding to the given superblock.

For the illustrated embodiment, if the first significant bit of the IP addresses of a superblock is "0" (branch 310a), its "leaf node" is disposed at the left-hand-side (LHS) of the "prefix tree". If the first significant bit of the IP addresses of a superblock is "1" (branch 310b), its "leaf node" is disposed at the right-hand-side (RHS) of the "prefix tree". The "lower levels" of the "prefix tree" are traversed in like manner to locate the ultimate "leaf node" storage location for a superblock. Thus, if a superblock does not exist (i.e. the IP addresses have not been assigned by any of the registrars, the corresponding "leaf node" will be missing, as the "leaf node" for the exemplary superblock having "10" as its two most significant bits (end of branch 310c missing a "leaf node").

FIG. 3b illustrates an alternate embodiment, wherein the entire "prefix tree" is subdivided into a number of smaller "prefix trees" 340a-340k (a "hybrid" implementation). The smaller "prefix trees" 340a-340k are indexed by the first n most significant bits of the superblock base IP address, where n is a power of two. The integer value of these first n bits is shown as numbers 320a-320k in FIG. 3b, and ranges from 0 to one less than two raised to the nth power. For the illustrated embodiment, n equals 8. For each superblock IP address, the n most significant bits of the address are first used to select the smaller "prefix trees" whose index corresponds to these bits. Subsequently, the selected smaller "prefix tree" is constructed as described above, using the remaining s-n bits of the superblock base IP address, where s is the size of the superblock IP address in bits. For IPv4 superblock addresses, the size s is 32 bits.

The above illustrated exemplary data structures are particularly suitable in facilitating quick lookup of superblock registrar and country information, starting with a given IP address. However, in alternate embodiments, other data structures may also employed to store the registrar, country, and community information of the superblock IP addresses. Further, other differentiating information may also be employed and stored.

Proximity Detection

Figure 6A:
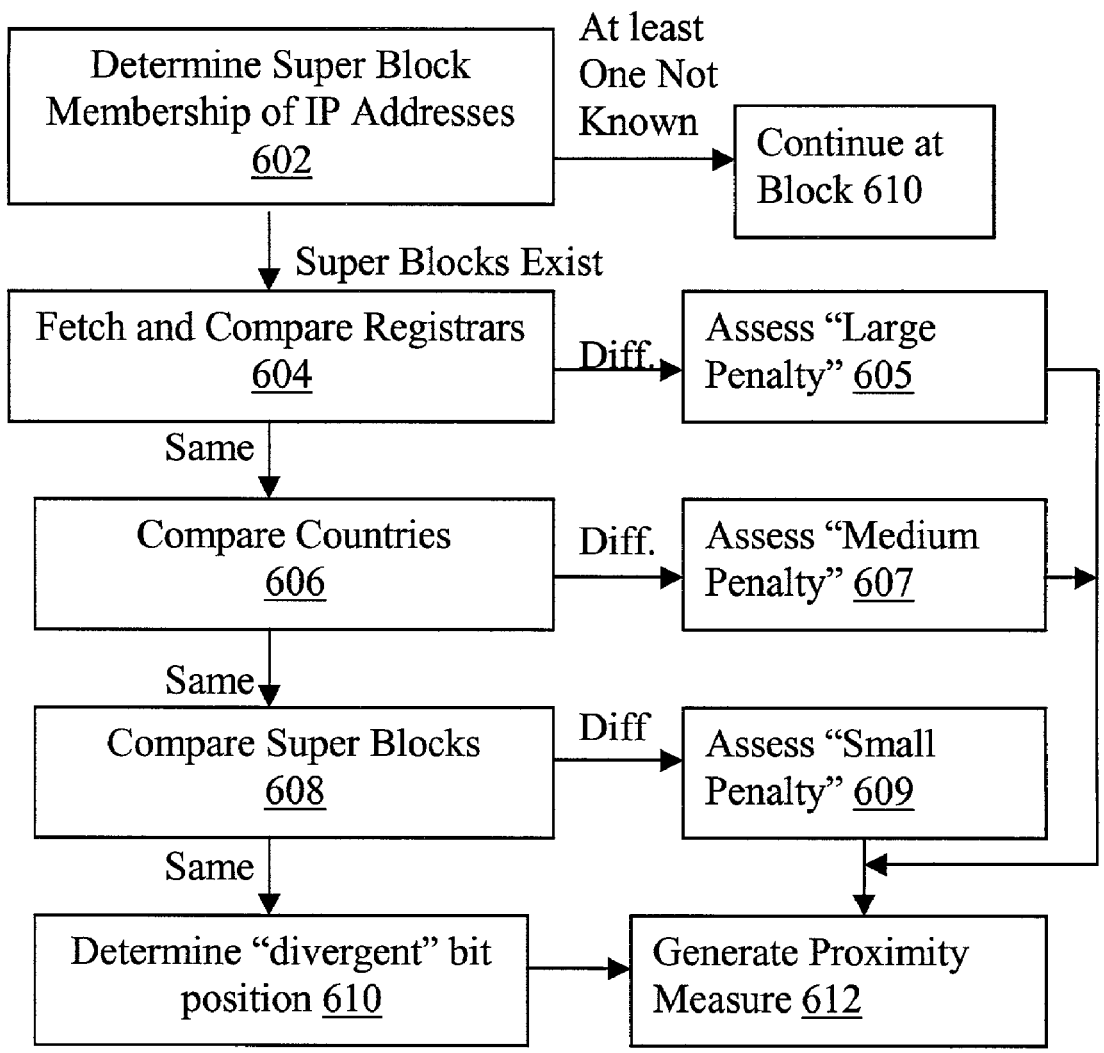
FIG. 6a-6b illustrate the operational flow of the relevant aspects of the proximity detector of FIG. 1, in accordance with two embodiments.

Referring now to FIG. 6a, wherein a block diagram illustrating the operational flow of the relevant aspects of the proximity detector 120 of FIG. 1, in accordance with a "general" embodiment, is shown. As illustrated, upon invocation to determine or detect the proximity of two given IP addresses, proximity detector 120 first accesses AALS 114 to determine the superblock memberships of the IP addresses of interest, block 602. If at least one of the IP address does not appear to be a member of any known superblock (which is possible as the assignment of the superblock may occur after the last update of AALS), or when the relevant IP address(es) belong to a Local Area Network (LAN) connected to the Internet via a Network Address Translator (NAT) device), a penalty is optionally assessed and the proximity detection process jumps to block 610 (to be described more fully later). In one embodiment, the penalty would be assessed by multiplying the distance metric computed in block 610 by eight and adding sixteen.

However, if both IP addresses are determined to be members of known assigned superblocks, the proximity detection process continues at block 604, wherein the registrars and country codes corresponding to the two superblocks of IP addresses are first fetched from the MLS Data Structure shown in two embodiments in FIG. 3a and FIG. 3b, respectively. The registrars are then compared. If the registrars corresponding to the two superblocks of IP addresses are determined to be different, a "large penalty" is assessed against the proximity or distance metric to be subsequently generated, block 605. In one embodiment, a penalty of 256 is assessed.

However, if the registrars corresponding to the two superblocks of IP addresses are determined to be the same, the proximity detection process continues at block 606, wherein the countries within which the two superblocks of IP addresses are located, are compared. If the countries are determined to be different, a "medium penalty" is assessed against the proximity or distance metric to be subsequently generated, block 607. In one embodiment, a penalty of 128 is assessed.

If the countries within which the two superblocks of IP addresses are located are determined to be the same, the proximity detection process continues at block 608, wherein the two superblocks themselves are compared. If the two superblocks are determined to be different, a "small penalty" is assessed against the proximity or distance metric to be subsequently generated, block 609. In one embodiment, a penalty of 64 is assessed.

If the two superblocks are determined to be the same, the proximity detection process continues at block 610, wherein the bits of the two IP addresses are compared, starting from the most significant bit to the least significant bit, to determine the first bit positions the two IP addresses begin to diverge or differ. The proximity or distance metric is then generated based on the position where the bits of the two IP addresses begin to diverge, block 612. The distance metric is set to be the number of bits from the first differing bit to the least significant bit. For the earlier cases, where penalties are assessed, the corresponding penalty is outputted as the proximity or distance measure.

In alternate embodiments, other approaches to quantitatively reflect the likely distance between two IP addresses may be employed instead. For example, different "penalties" may be imposed instead. Preferably, the amount of penalty imposed is also configurable by the service provider of IPAP detection system 110.

In various alternate embodiments, an additional penalty can be assessed in block 612 based on the superblock community information contained in the AALS data structures 114. If, by advantageously using the AALS data structures 114, the two IP addresses are found to have different AS numbers, an additional "large penalty" can be assessed. In one alternate embodiment, this additional "large penalty" would be 32. If, however, the AS numbers, although different, are found to belong to the same community (as defined in the BGP protocol), an additional "small penalty" is assessed. In one alternate embodiment, the additional "small penalty" would be 16. If the two IP addresses are found to have the save AS numbers, no additional penalty is assessed.

Figure 6B:
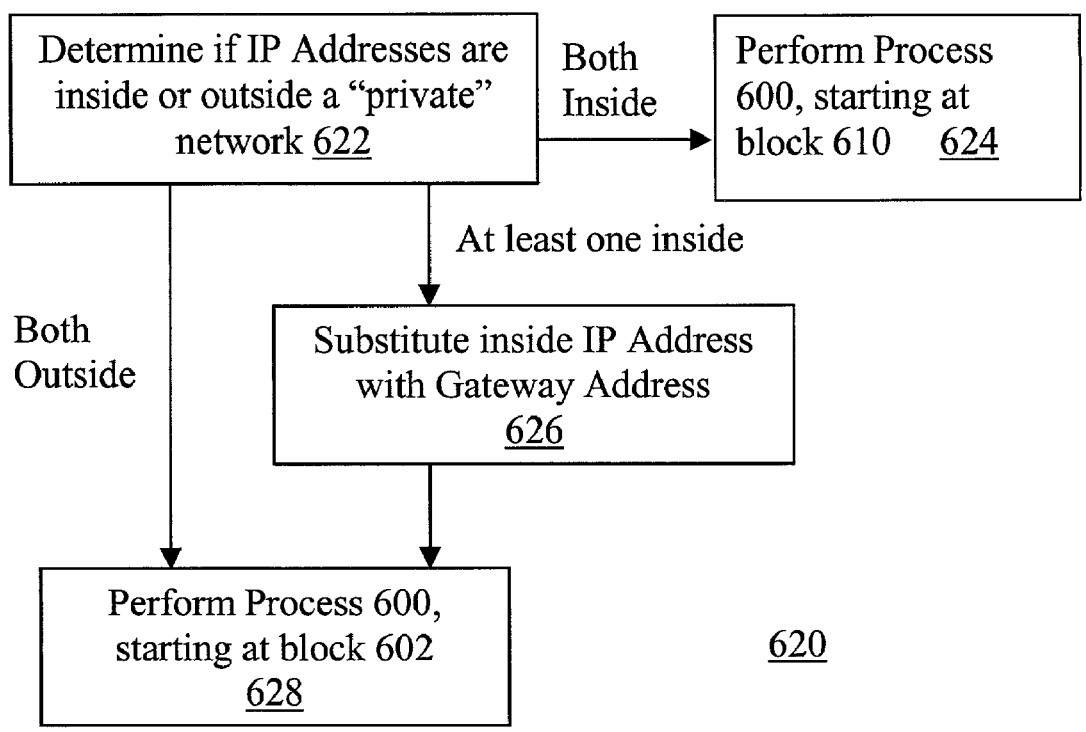

FIG. 6b illustrates the operational flow for an alternate embodiment of proximity detector 120, operating inside a private, e.g. corporate, network behind a Network Address Translator (NAT) firewall or proxy. As illustrated, proximity detector 120 can be configured to assess different penalties depending on whether both IP addresses are inside the private network or not, block 622. If both IP addresses are inside the private network, block 624, process 600 of FIG. 6a is performed, starting at block 610. That is, only the distance determined in block 610 is used for proximity detection, but no other penalties are assessed. If one of the IP addresses is inside the private network, but the other one is outside, the outside IP address of the gateway is first substituted for the local IP address before process 600 of FIG. 6a is performed, starting from the beginning. If both IP addresses are outside the private network, process 600 of FIG. 6a is performed as discussed above.

The proximity determination process described above may be implemented very efficiently as one AALS lookup per address, followed by simple comparisons, binary masks, and binary shifts. To lookup which superblock a given IP address belongs to, the largest base address (of a superblock in the AALS) that is smaller than or equal to the IP address is first determined. For the earlier described "first embodiment", this may be achieved quickly through binary search of the sorted list of the superblocks, and checking whether the superblock thus located does indeed match the IP address for that block's number of significant bits. The contrary would indicate that the IP address is not in any existing (i.e. known) superblock. For the earlier described "prefix tree" embodiment, this may be achieved by descending the prefix tree along the path of nodes that match the successive bits of the IP address, from most significant to least significant, until a leaf node is reached or no laid path can be found (which would indicate that the IP address is not in any known superblock). For the earlier described "hybrid" embodiment, the first few bits of the address are used to select the appropriate prefix tree, which is then used as above for the remaining bits.

The efficiency of the lookups depends on the chosen implementation for the AALS. The "binary search" implementation is expected to yield a uniform cost of lookup, requiring a number of 32-bit comparisons equal to the base-2 logarithm of the total number of superblocks in the AALS. On the other hand, in the "prefix-tree" implementation, a lookup requires a number of 1-bit comparisons equal to the number of significant bits (and thus, the category) of the superblock to which the IP address belongs. Since large superblocks of the lower categories contain many more addresses than the higher category ones, the "prefix tree" implementation is likely to have the advantage that the most frequent lookups will also be the fastest lookups. In fact, assuming that the entire address space is allocated, and that the IP addresses are uniformly distributed over that space, it can be shown that the "prefix tree" achieves the smallest expected number of binary comparisons. The "hybrid" implementation is expected to attain even better performance by resolving the first few bits of the IP address using a single indexing operation into a table. For example, if 12 bits are used for the first level of the hybrid method, the superblock containing a given IP address will be determined in a single step if the superblock is of class/12 or less. Since the address belonging to the largest blocks are also the most frequent ones, the average savings are very significant. In practice, using up to 16 bits for the first stage of the "hybrid" method will enable a very large fraction of all IP addresses to be resolved in a single step, at the reasonable additional cost of maintaining the first-level lookup table (if 16 bits are used, this table will have 65,536 entries, a size that can be accommodated by most current computing devices).

AS/IP Data Structure Builder

Figure 4:
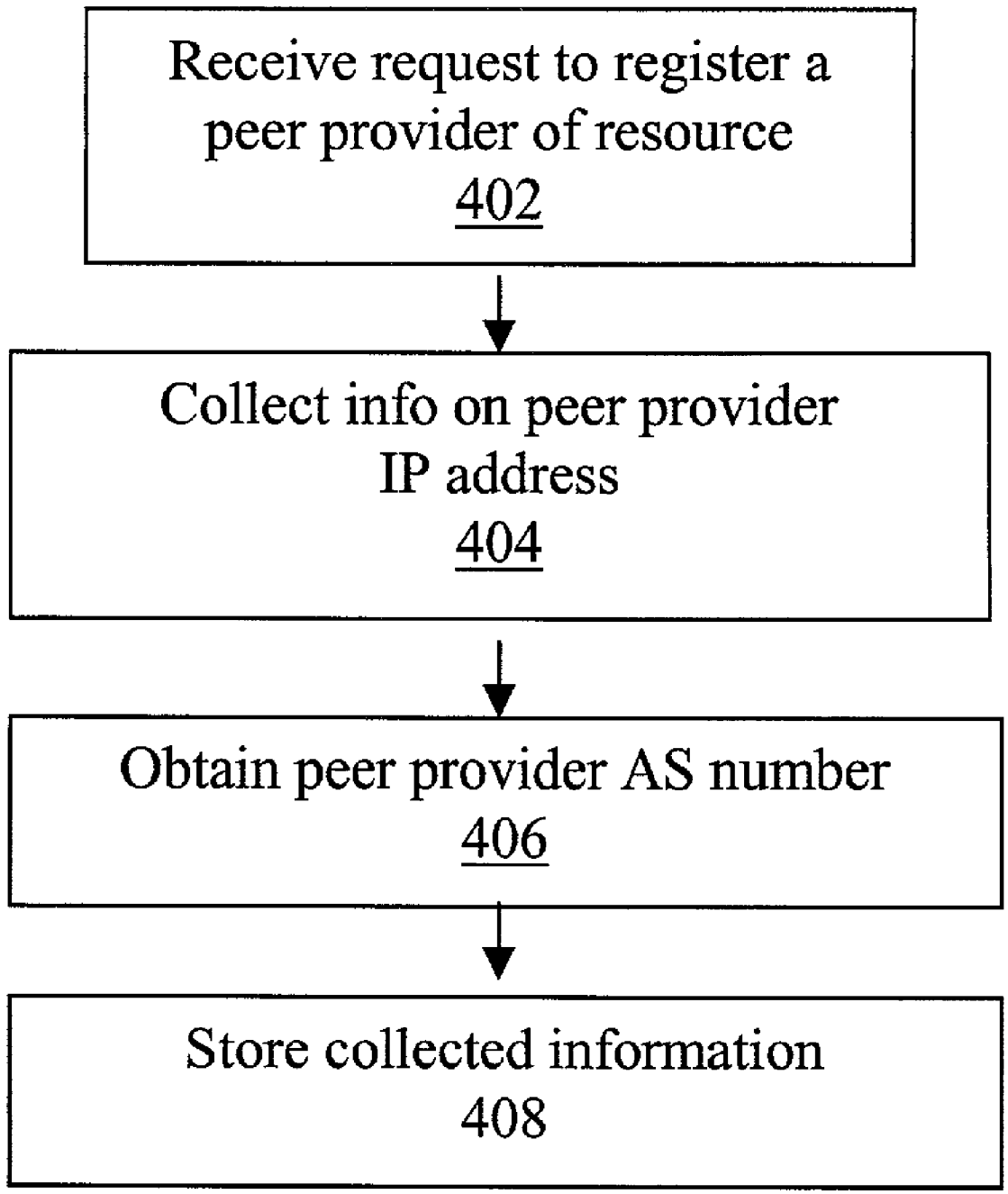
FIG. 4 illustrates the operational flow of the relevant aspects of the AS/IP data structure builder of FIG. 1, in accordance with one embodiment.

Referring now to FIG. 4, wherein a block diagram illustrating the operational flow of the relevant aspects of the AS/IP data structure builder 116 of FIG. 1, in accordance with one embodiment, is shown. As alluded to earlier, for the illustrated embodiment, IPAP detection system 110, in addition to the teachings of the present invention for detecting IP address proximity, is further incorporated with the teachings of the present invention to apply the IP address proximity detection technology to providing a client with a list of proximally located peer providers for resources of interest. To that end, IPAP detection system 110 is further equipped with AS/IP data structure builder 106 and peer provider locator 122.

As illustrated in FIG. 4, for the embodiment, upon receipt of each registration of a peer provider 132 of a given resource, block 402, AS/IP data structure builder 116, as part of the registration process, obtains the IP address of the peer provider 132, block 404. In one embodiment, this IP address is obtained from the peer provider itself. In another embodiment, this IP address is obtained as a parameter of the network connection between the peer provider 132 and IPAP detection system 110.

Based on the IP address, AS/IP data structure builder 116 determines the AS number of peer provider, block 404. In one embodiment, AS/IP data structure builder 116 obtains the AS number information by using aBGP feed. In an alternate embodiment, AS/IP data structure builder 116 uses information supplied by the administrator of the IPAP detection system 110 to compute AS numbers; this information in turn can, but need not necessarily, be derived from a BGP feed. In yet another embodiment, the AS number is supplied by the peer provider 132 itself.

In block 404, AS/IP data structure builder 116 stores the obtained IP address and AS numbers information in the earlier mentioned AS/IP data structures 118, for subsequent user by peer provider locator 122 during operation.

AS/IP Data Structure

Figure 5:
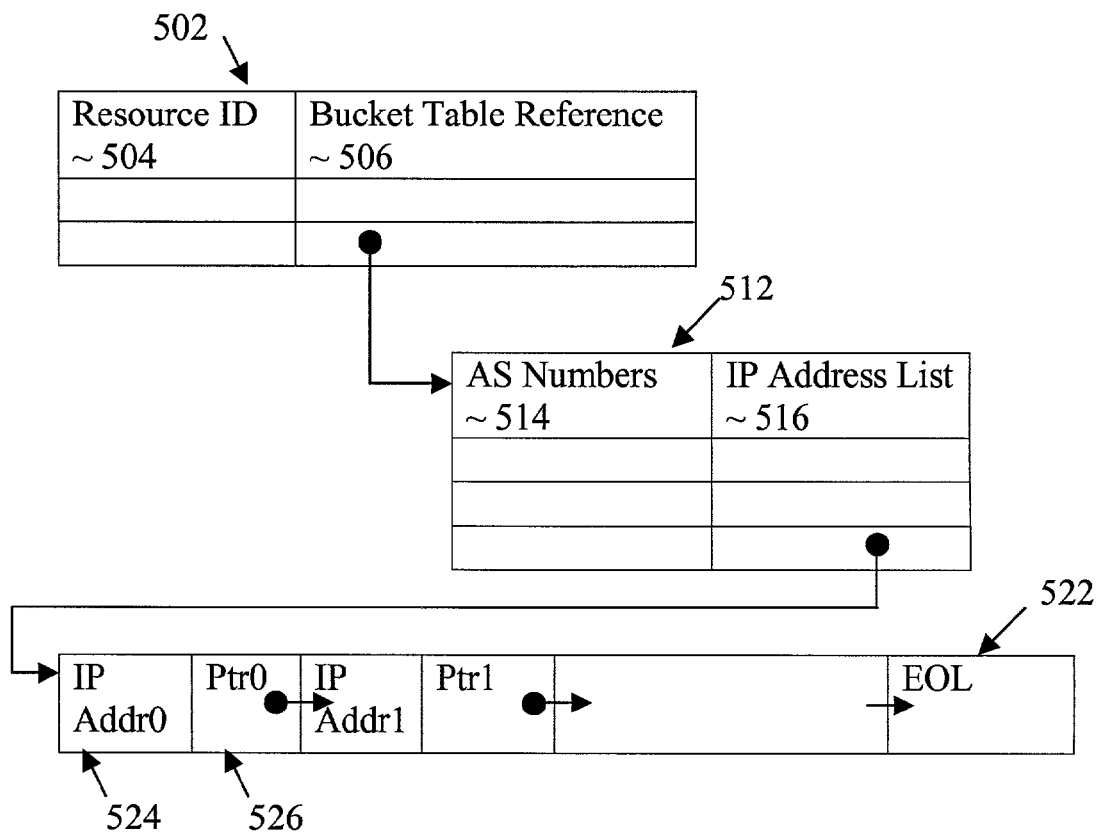
FIG. 5 illustrates an example data structure suitable for use to implement the AS/IP data structure of FIG. 1, in accordance with one embodiment.

Referring now to FIG. 5, wherein a block diagram illustrating a collection of data structures suitable for use to store the AS numbers and the IP addresses of the peer providers of various resources of interest, in accordance with one embodiment, is shown. The data structures shown in the block diagram facilitate efficient retrieval of peer provider IP addresses of proximally located peer providers, given a specified resource.

As illustrated, for the embodiment, AS/IP data structures 500 include table 502 having a number of columns 504-506 for storing resource identifiers identifying the various resources whose peer providers are tracked, column 504, and references to the bucket tables 512, column 506. AS/IP data structures 500 also include bucket tables 512 having a number of columns 514-516 for storing AS numbers of the peer providers, column 514, and pointers to IP address lists within the AS number buckets, column 516. In otherwords, for the embodiment, the IP addresses of the peer providers are organized by the peer providers' AS numbers. For the illustrated embodiment, each IP address list 522 for an AS number includes one or more IP addresses of peer providers "linked" together for retrieval (ref. 524 and 526), with the last IP address having an associated "end of list" (EOL) marker (or a null value).

In alternate embodiments, other data organizations may be employed instead.

Peer Provider Locator

Figure 7A:
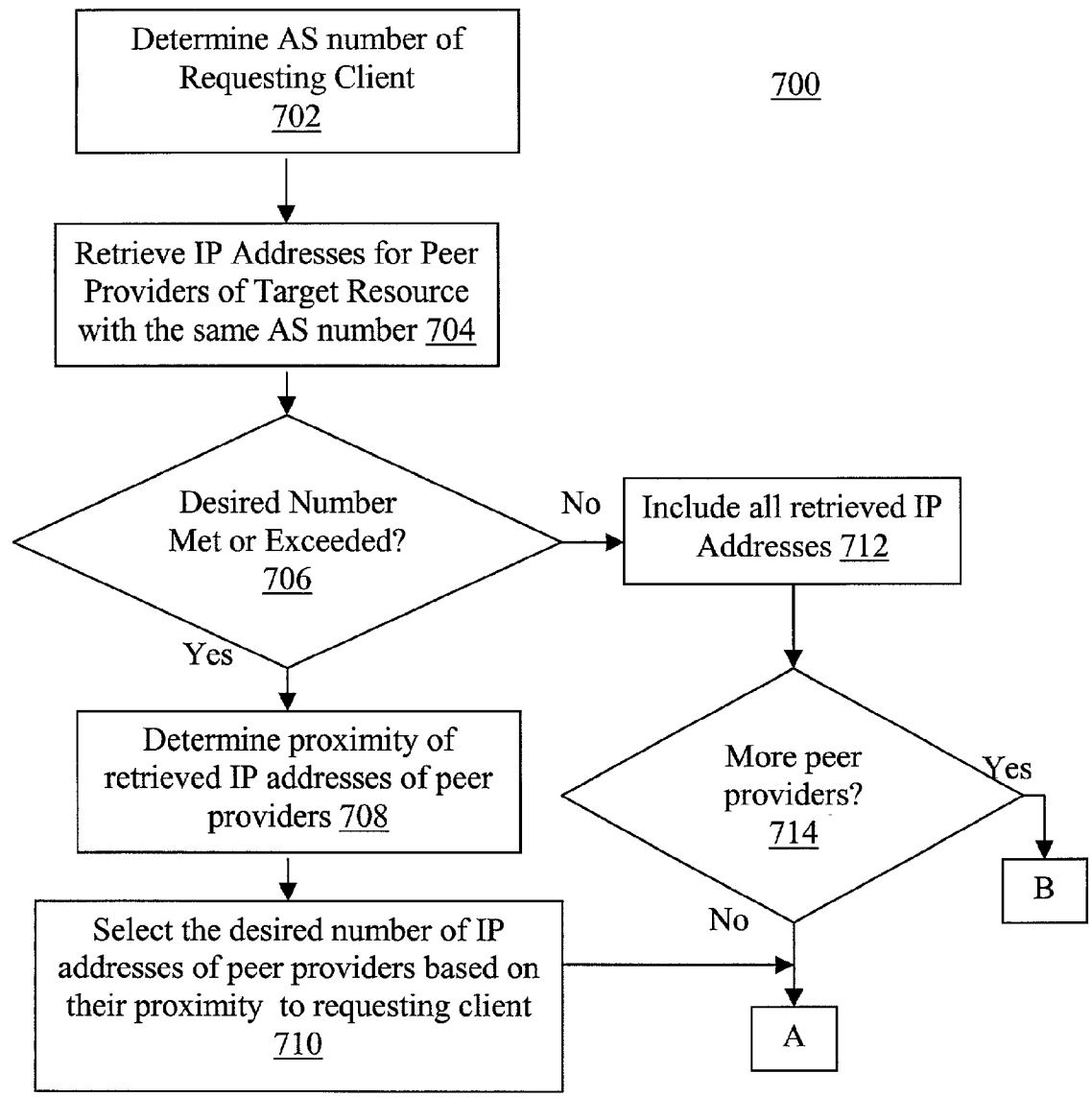
FIGS. 7a-7c illustrate the operational flow of the relevant aspects of the peer provider locator of FIG. 1, in accordance with one embodiment.
Figure 7B:
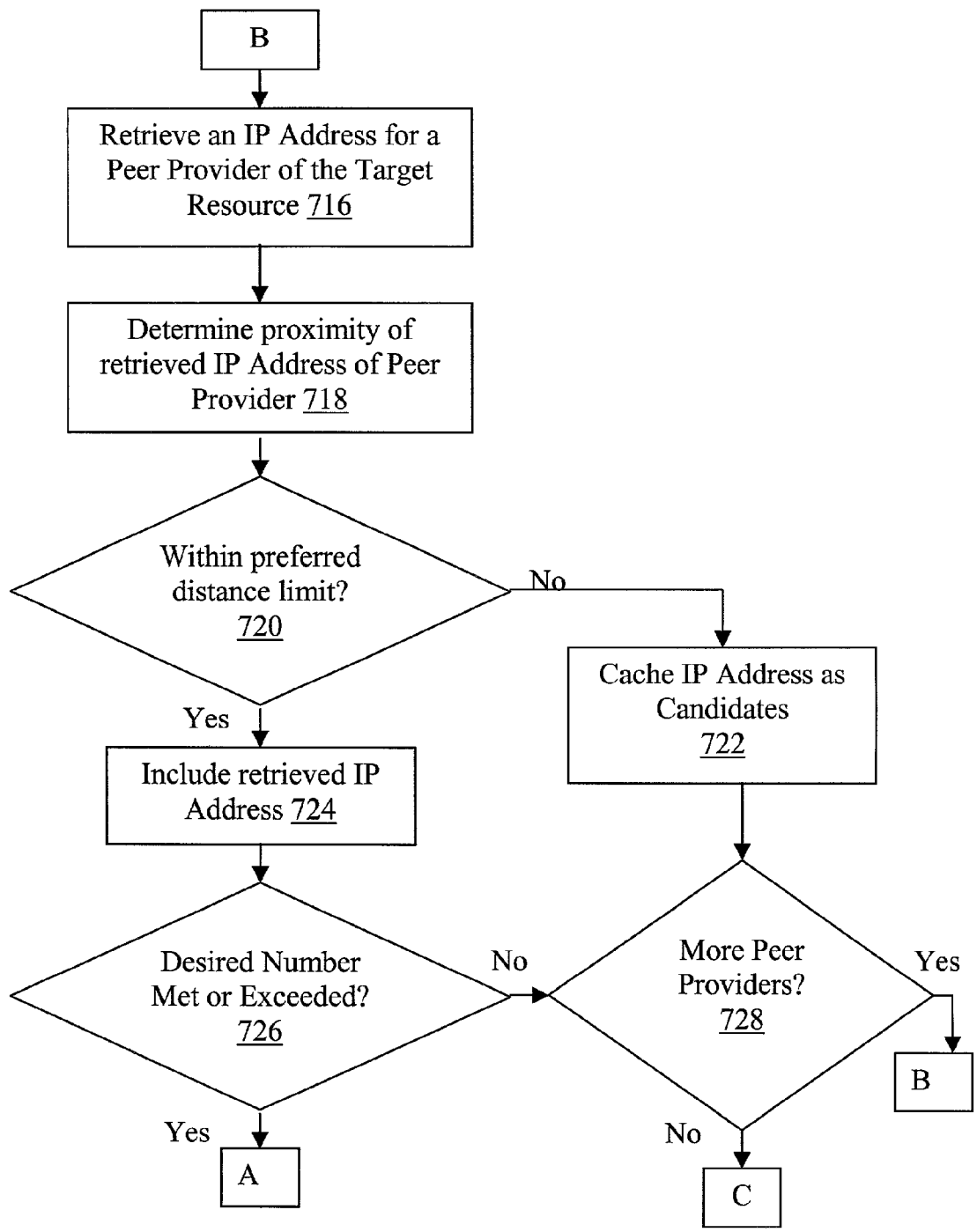
Figure 7C:
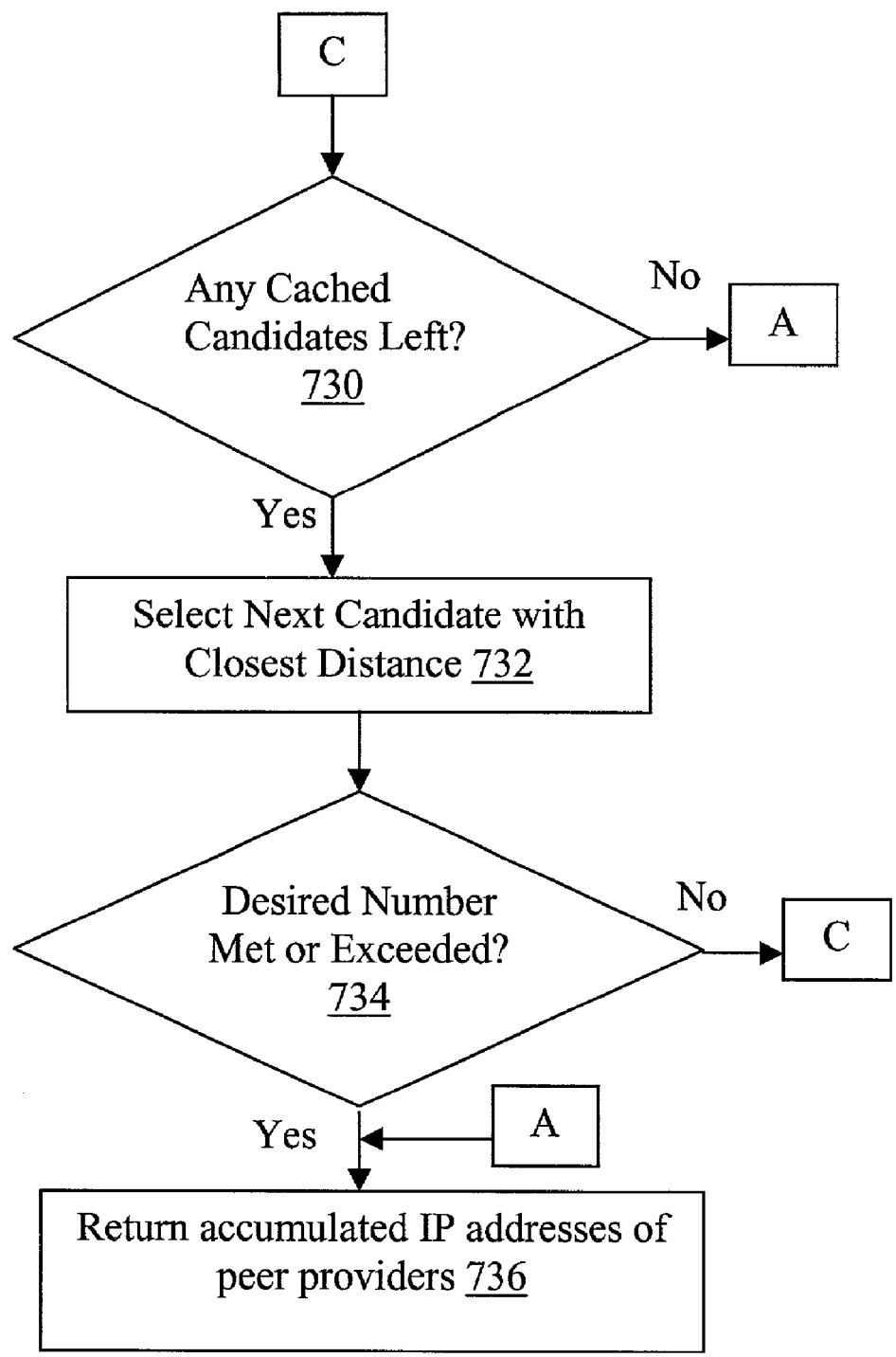

Referring now to FIG. 7, wherein a block diagram illustrating the operational flow of the relevant aspects of peer provider locator 122, in accordance with one embodiment, is shown. As illustrated, for the embodiment, upon requested by a client 132 to provide a desired number of peer providers for a specified target resource, peer provider locator 122 first determines the AS number of the requesting client 132, block 702. For the illustrated embodiment, peer provider locator 122 extracts the AS number of requesting client 132 from the received communication and determines the AS number of requesting client 132 by using the AS/IP data structures 118 that have been previously constructed by the AS/IP data structure builder 116. In an alternate embodiment, the AS number is part of the communication through which the request is conveyed to IPAP detection system 110.

In this application, the system is used to retrieve a number of addresses satisfying a particular condition (such as serving a copy of a particular resource in a peer-to-peer architecture), such that the addresses are proximal, in terms of Internet topology and efficiency, to a given target IP address. In practice, the target IP address will be that of a peer wishing to access a particular resource; the retrieved addresses will correspond to the IP addresses of peers which can supply the desired resource.

In one embodiment, the desired number of peer providers to be returned is specified in the request. In another embodiment, the desired number of peer providers to be returned is implicitly specified via a configurable parameter of the requesting client and/or IPAP detection system 110. In the cases where both the requesting client and IPAP detection system 110 specify the desired number, either may control, depending on the implementation.

At block 704, peer provider locator 122 accesses AS/IP data structures 118 and attempts to retrieve the IP addresses of the peer providers of the target resource of interest with the same AS number as that of the requesting client 132, as determined in block 702. At block 706, peer provider locator 122 determines if it was successful in retrieving a number of IP addresses of the peer providers of the target resource of interest that meets or is in excess of the desired number of IP addresses of peer providers to be returned.

If the number of IP addresses of peer providers retrieved from the community with the same AS number meets or exceeds the desired number of peer providers to be returned, peer provider locator 122 determines the proximity of the retrieved IP addresses to the IP address of the requesting client 132, block 708. For the illustrated embodiment, peer provider locator 122 advantageously determines the proximity of the retrieved IP addresses by invoking proximity detector 120. (In various embodiments, the information about whether the IP addresses share the same AS number, as well as other relevant information may be provided to proximity detector 120 to enable proximity detector 120 to streamline its decision process). Thereafter, peer provider locator 122 selects the peer providers with the "closest" IP addresses (i.e. the peer providers with the smallest distance to the IP address of the requesting client 132, as computed by the proximity detector 120) as the peer providers to be returned to requesting client 132, block 710, and returns the selected IP addresses accordingly, block 736.

Back at block 706, if not enough IP addresses of peer providers have been retrieved, either because there are no peer providers (i.e. peer providers located within the same AS number bucket 516, for the embodiment), or there are insufficient numbers of peer providers, peer provider locator 122 includes all retrieved IP addresses of peer providers with the same AS number, if any, as part of the eventual answer set to be returned to requesting client 132, block 712.

Peer provider locator 122 then accesses AS/IP data structures 118 again to determine if there are additional peer providers having other AS numbers, block 714. If not, peer provider locator 122 returns to requesting client 132 the set of IP addresses that it has managed to retrieve thus far. Preferably, a warning or error code is included to denote that less than the desired number of IP addresses of peer providers or no IP addresses of peer providers are returned.

If additional peer providers with AS numbers different from that of the requesting client 132 have been found, peer provider locator 122 continues the peer provider selection process at block 716, wherein it retrieves and examines these additional IP addresses of peer providers, block 716 and 718. In one embodiment, peer providers having other AS numbers than the requesting client are selected arbitrarily (i.e. in a random order) for analysis. In other embodiments, other auxiliary information may be employed to assist in their selection for analysis. For each selected peer provider, peer provider locator 122 advantageously determines its proximity to the requesting client 132, block 718, by invoking proximity detector 120.

For the illustrated embodiment, peer provider locator 122 determines whether the selected peer provider is within a predetermined distance from requesting client 132, block 720. If the selected peer provider is proximally located within the predetermined distance from requesting client 132, peer provider locator 122 includes the analyzed peer provider as part of the answer set to be later returned to requesting client 132, block 724. Thereafter, peer provider locator 122 determines whether the number of peer providers accumulated thus far meets or exceeds the desired number of peer providers to be returned to requesting client 132 or not, block 726. If the desired number of peer providers to be returned is being met, peer provider locator 122 proceeds to block 736, and returns the accumulated peer providers to requesting client 132.

On the other hand, if the desired number of peer providers to be returned still has not been met, peer provider locator 122 proceeds to block 728 and determines if there are still other peer providers with AS number different from that of the requesting client 132 remain to be selected for analysis, block 728. If such providers exist, peer provider locator 122 proceeds back to block 716. If the list of peer providers has been exhausted, peer provider locator 122 proceeds to block 730.

Back at block 720, if the selected peer provider is not proximally located within the predetermined distance from requesting client 132, peer provider locator 122 caches the identification and the distance of the analyzed peer provider for potential subsequent further analysis, block 722. Upon caching the information, peer provider locator 122 also proceeds to block 728 and determines if there are still other peer providers that remain to be selected for analysis.

If there are still other peer providers with AS number different from that of the requesting client 132 remain to be selected for analysis, peer provider locator 122 returns to block 716 and selects another one of these peer providers for analysis, and continues from there as earlier described. If all other peer providers located in other "network communities" have been analyzed, peer provider locator 122 continues the process at block 730.

At block 730, peer provider locator 122 determines whether there are any "cached" peer providers, i.e. previously analyzed peer providers but not within the predetermined proximal distance from requesting client 132. If there are "cached" peer providers available for analysis, peer provider locator 122 advantageously selects the next "closest" peer provider for inclusion in the answer set to be returned, block 732, by advantageously using the distance information cached in block 722. Upon so selecting, peer provider locator 122 determines if the desired number of peer providers to be returned is being met, block 734. If it is, peer provider locator 122 proceeds to block 736 and returns the IP addresses of the peer providers accumulated thus far.

If back at block 734, it is determined that the desired number of peer providers to be returned still has not been met, peer provider locator 122 returns to block 730 and continues the process as earlier described. Eventually, peer provider locator 122 either manages to accumulate the desired number of peer providers to be returned, and returns them accordingly at block 736 as earlier described, or it is going to determine at block 730 that no more cached peer provider remains to be analyzed. At such time, peer provider locator 122 proceeds to block 736 and returns whatever number of IP addresses of peer providers it has managed to accumulate thus far.

Client

Figure 8:
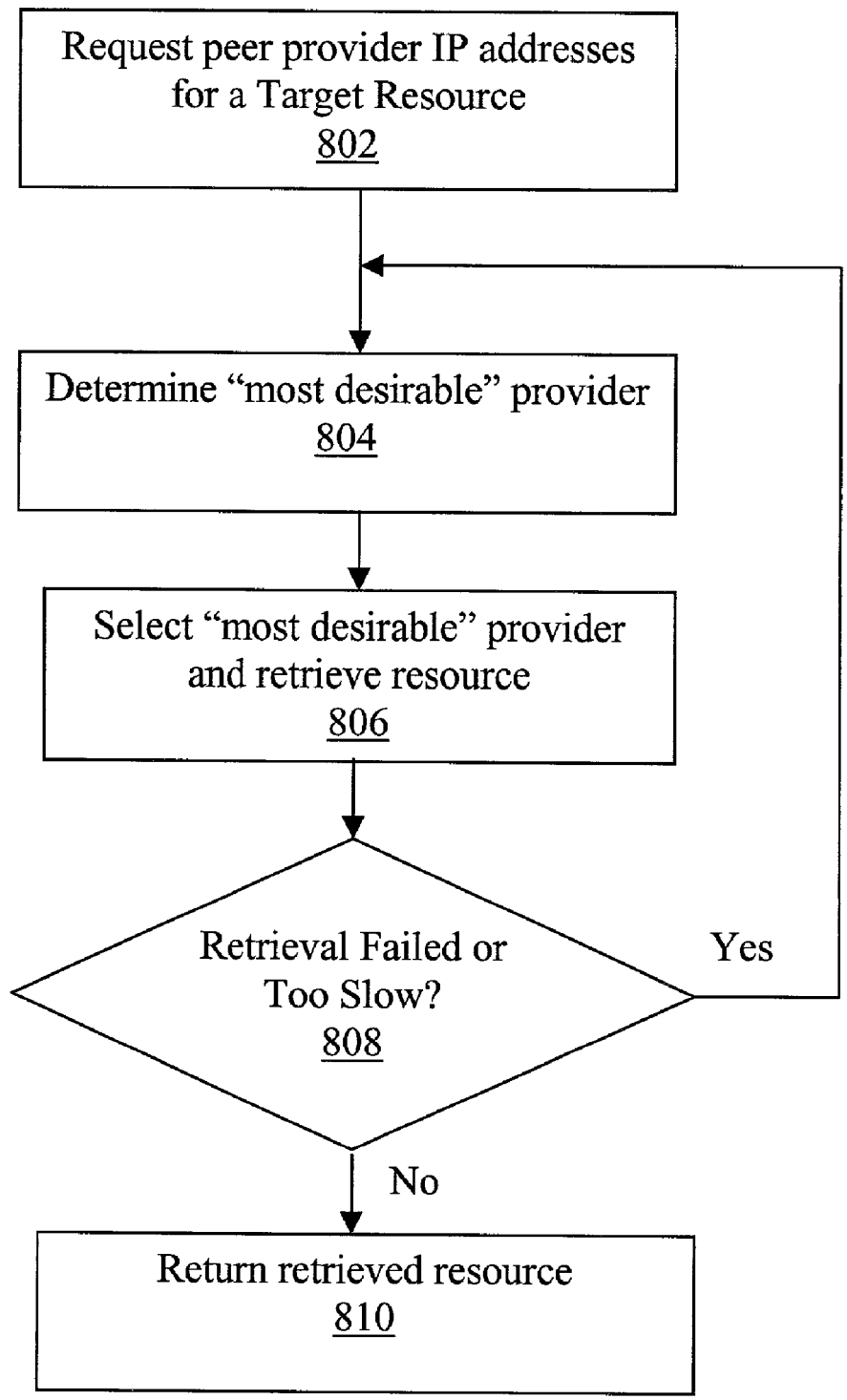
FIG. 8 illustrates the operational flow of the client of FIG. 1, in accordance with one embodiment.

Referring now to FIG. 8, wherein a block diagram illustrating the operational flow of the relevant aspects of a client 132 of FIG. 1, in accordance with one embodiment, is shown. As illustrated, client 132 requests peer provider locator 123 to return IP addresses of peer providers that can provide a specified target resource of interest, block 802. As described earlier, in response, peer provider locator 123 goes through the earlier described peer provider selection process 700, and if possible, selects up to the desired number of IP addresses of peer providers to be returned to return to requesting client 132.

Upon receipt of the returned IP addresses, client 132 determines which one among the returned IP addresses is the "most desirable" peer provider for the target resource of interest, block 804. What constitutes the "most desirable" peer provider varies from application to application. In one embodiment, client 132 determines which of the returned peer providers is the "most desirable" by comparing the connection set up times of the different IP addresses. In another embodiment, client 132 determines the "most desirable" peer provider by sending a "ping" message to each of them, and selecting the one to respond the fastest. In yet another embodiment, client 132 makes the determination based to the transfer data rates achievable for the different IP addresses. In yet another embodiment, client 132 makes the determination based on the fluctuations of the data transfer rates of the different IP addresses.

Upon making the determination, client 132 selects the "most desirable" provider for the target resource of interest, and retrieves the target resource from the selected provider, block 806. In one embodiment, at block 808, client 132 from time to time during the retrieval process examines the retrieval status and speed. If the client 132 determines that the retrieval is too slow or has failed (i.e. the peer provider has failed to maintain the retrieval network connection with the client 132), the client aborts the retrieval process, and continues at block 804 to select another peer provider.

Example Computer System

Figure 9:
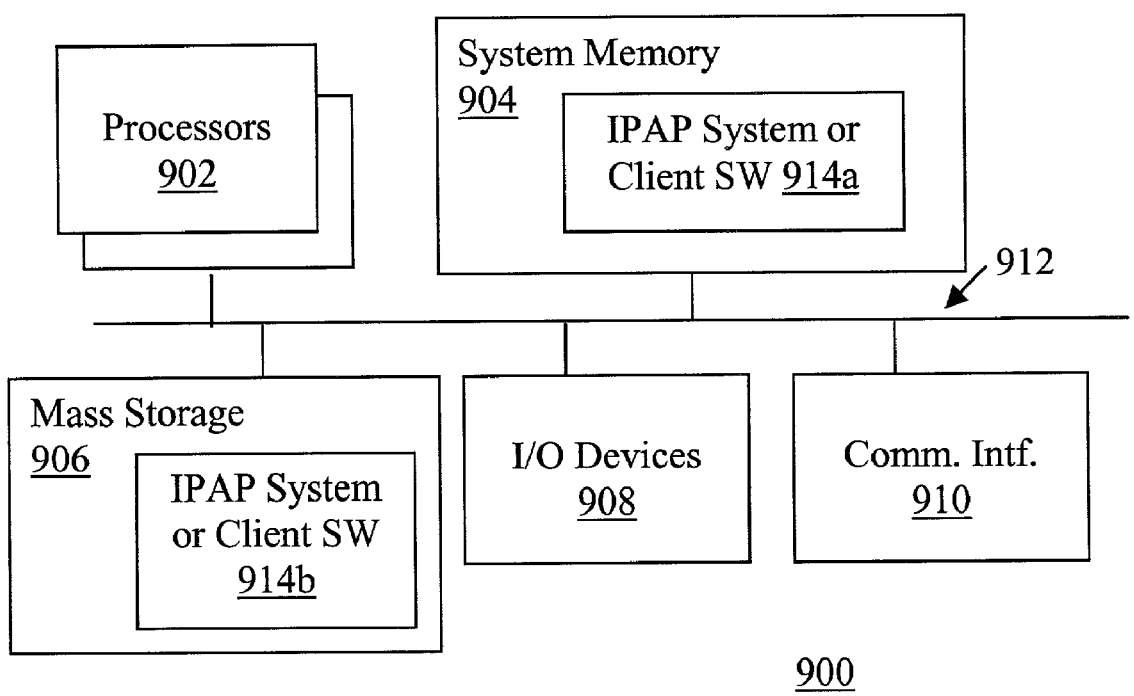
FIG. 9 illustrates an example computer system suitable for use to practice the present invention, in accordance with one embodiment.

FIG. 9 illustrates an exemplary computer system 900 suitable for use to host IPAP detection system 110 or as client 132 of FIG. 1, in accordance with one embodiment. As shown, computer system 900 includes one or more processors 902 and system memory 904. Additionally, computer system 900 includes one or more mass storage devices 906 (such as diskette, hard drive, CDROM and so forth), one or more input/output devices 908 (such as keyboard, cursor control and so forth) and communication interfaces 910 (such as network interface cards, modems and so forth). The elements are coupled to each other via system bus 912, which represents one or more buses. In the case of multiple buses, they are bridged by one or more bus bridges (not shown). Each of these elements performs its conventional functions known in the art. In particular, system memory 904 and mass storage 906 are employed to store a working copy and a permanent copy of the programming instructions implementing the teachings of the present invention (i.e. IPAP detection System 110 or the client side software). The permanent copy of the programming instructions may be loaded into mass storage 906 in the factory, or in the field, as described earlier, through a distribution medium (not shown) or through communication interface 910 (from a distribution server (not shown). The constitution of these elements 902-912 are known, and accordingly will not be further described.

While example computer system 900 has been described as being suitable for use to host IPAP detection system 110 or the client side software, those skilled in the art will also appreciate that example computer system 900 may also be used to practice the location server aspect of the present invention, or the distributed storage itself. In alternate embodiments, each of these aspects (i.e. IPAP detection system 110, etc.) may also be practiced on multiple systems.

Modifications and Alterations

While the present invention has been described referencing the illustrated and above enumerated embodiments, the present invention is not limited to these described embodiments. Numerous modification and alterations may be made, consistent with the scope of the present invention as set forth in the claims to follow.

For example, if the IPAP system is to be deployed within a private network (either a LAN, WAN, or a collection thereof in a VPN), that is bridged to the Internet via Network Address Translation (NAT) devices, the AALS builder can be configured to include additional "superblocks" that correspond to the various address ranges defined by said private network.

In another extension, an IPAP-enabled client seeking to retrieve a resource may use a plurality of "most desirable" providers of the resource, retrieving complementary fragments (or stripes) of the resource from each of the selected providers.

Of course, the above examples are merely illustrative. Based on the above descriptions, many other equivalent variations will be appreciated by those skilled in the art.

Conclusion and Epilogue

Thus, a method and apparatus for detecting IP address proximity, and applying the technique to peer provider selection, has been described. Since as illustrated earlier, the present invention may be practiced with modification and alteration within the spirit and scope of the appended claims, the description is to be regarded as illustrative, instead of being restrictive on the present invention.

What is claimed is:

1. A method performed by a computing device for selecting a peer that is providing a requested resource being shared on a peer-to-peer network, the resource having been requested by another peer in the peer-to-peer network, the peers comprising devices participating in a peer-to-peer network in which each peer publishes resources originating therefrom, each peer caches resources published by and obtained from other peers, each peer provides its cached resources to the other peers, and peers originate requests for resources stored by other peers and thereby obtain resources from other peers, the method comprising:
   obtaining blocks of IP address assignments of peers in the peer-to-peer network, the blocks of IP address assignments having been obtained from Address Allocation Tables (AATs) of a plurality of respective Internet Protocol (IP) address assigning registrars;
   processing and storing said obtained blocks of IP address assignments, and storing in association with each block of IP address assignments corresponding assignment information comprising information identifying the registrar from which the block of IP address assignments was obtained and which assigned IP addresses in the block, wherein some of the blocks of IP address assignments contain IP addresses of peers in the peer-to-peer network;
   receiving autonomous system (AS) numbers of peers in the peer-to-peer network and storing AS information indicating which IP addresses of the peers are associated with which of the AS numbers;
   receiving a first IP address of a requesting peer in the peer-to-peer network that is originating a request for a target resource;
   determining from the AS information the AS number of the first IP address;
   selecting a plurality of IP addresses of peers based on the peers of the respective IP addresses having the target resource and selecting the plurality of IP addresses based on the IP addresses having, according to the AS information, an AS number matching the AS number of the first IP address;
   determining proximity measures indicating proximities between said first IP address and the plurality of IP addresses, where the proximity measures between the first IP address and each of the plurality of IP addresses, respectively, are based at least in part on the assignment information of the first IP address and the assignment information of the plurality of IP addresses; and
   transmitting to the requesting peer one of the IP addresses selected based on its corresponding proximity measure.

2. The method of claim 1, wherein said assignment information further comprises geographical location information for various of the blocks of IP address assignments which are used as a further basis for determining one or more of the proximity measures.

3. The method of claim 2, wherein said geographical location information for various blocks of IP address assignments comprises country identifications of countries within which IP addresses of said blocks reside, and community information assigned to said blocks of IP address assignments.

4. The method of claim 1, wherein said processing and storing comprises sort-merging said retrieved IP address assignments into a data structure based on superblock base addresses.

5. The method of claim 1, wherein said processing and storing comprises organizing and storing said blocks of IP address assignments into a plurality of prefix trees.

6. The method of claim 1, wherein said determining proximity measures comprises identifying geographical locations of said first and the plurality of IP addresses.

7. The method of claim 6, wherein said identifying of the geographical locations comprises identifying the registrars responsible for assigning said first IP address and the plurality of IP addresses.

8. The method of claim 7, wherein said identifying of the registrars comprises identifying membership in blocks of IP address assignments.

9. A method to select a peer that is providing a requested resource being shared on a peer-to-peer network, the resource having been requested by another peer in the peer-to-peer network, the peers comprising peer devices participating in a peer-to-peer network in which peers publish resources originating therefrom, peers cache resources published by and obtained from other peers, and each peer provides its cached resources to the other peers, and peers originate requests for resources stored by other peers and thereby obtain resources from other peers, the method comprising:
   identifying a plurality of IP addresses of peers in the peer-to-peer network based on a determination that they are providing the resource requested by the requesting peer, where the IP addresses are identified based also on their having an associated AS number that is the same as an AS number associated with a first IP address that is an address of the requesting peer;
   selecting from among the plurality of IP addresses a second IP address that is an address of one of the peers having been determined to be providing the requested resource to the peer-to-peer network, the selecting being based on computed metrics of distance between the first IP address and the respective IP addresses of the plurality of IP addresses, the metric of distance between the first IP address and any given second IP address in the plurality of IP addresses being determined by acts comprising:

comparing IP address block membership of the given IP address with IP address block membership of the first IP address, the IP address blocks comprising ranges of assignable IP addresses obtained from AATs of IP address registrars, the comparing comprising finding an IP address block that contains the first IP address, finding an IP address block that contains the given IP address, and determining if the found IP address blocks correspond to a same IP address registrar.

10. The method of claim 9, wherein the distance metric is further computed by performing a bit-wise comparison of said first and second IP addresses when the result of said block membership determination indicates that at least one of said first and second IP addresses does belong to an IP address block.

11. The method of claim 9, wherein said distance metric is reflective of the fact that different registrars are assigned to said first and second IP addresses if it is determined that said first and second IP addresses do not share a same IP address registrar.

12. The method of claim 9, wherein said determining the distance metric further comprises determining whether a same country hosts both said first and said second IP address, when said registrars are the same.

13. The method of claim 12, wherein said distance metric is reflective of the fact that different countries host said first and second IP addresses if it is determined that a same country does not host both said first and second IP addresses.

14. The method of claim 12, wherein said determining the distance metric further comprises determining whether said first and second IP addresses belong to a same block when the result of said country determination indicates that a same country hosts both said first and second IP addresses.

15. The method of claim 14, wherein said distance metric is reflective of the fact that said first and second IP addresses have different block memberships, if it is so determined.

16. The method of claim 9, wherein said method further comprises determining whether said first and second IP addresses both correspond to a same AS number, and conditionally modifying said determined distance metric based on the result of said AS number determination.

17. The method of claim 9, wherein said method further comprises determining whether said first and second IP addresses correspond to a common community.

18. One or more storage media having stored thereon a plurality of programming instructions that when executed by a computing device select a peer from which to acquire a target resource, the instructions comprising:
storing blocks of IP address assignments and for each block of IP address assignments storing information identifying a registrar responsible for the block of IP address assignments, the blocks including IP addresses of peers participating in a peer-to-peer network in which peers publish resources originating therefrom, peers cache resources published by and obtained from other peers, each peer provides it cached resources to the other peers, and peers originate requests for resources stored by other peers and thereby obtain resources from other peers;
storing autonomous system IP(AS/IP) information comprising AS numbers and corresponding IP addresses of peers in the peer-to-peer network;
receiving a first IP address of a peer requesting the target resource and searching the AS/IP information to find the AS number of the first IP address; and
selecting an IP address of a peer from among a plurality of IP addresses of peers determined to be currently providing the target resource on the peer-to-peer network, where the IP address is selected by comparing measures of proximity, where the measures are of proximity between the first IP address and each of the IP addresses in the plurality, a measure of a second IP address of any given IP address in the plurality indicating a degree of proximity between said first IP address and a second IP address, where the measure of the second IP address is computed by determining, from the blocks of IP address assignments, whether the first IP address and second IP address belong to blocks that are associated with a same registrar, and the proximity measure is further computed by finding an AS number for the second IP address in the stored AS/IP information, and the IP address.

19. The media of claim 18, wherein said programming instructions enable the apparatus to store geographical location information for various of the IP address assignment blocks, wherein the geographical location information is used to further compute a proximity measure.

20. The media of claim 19, wherein said programming instructions enable the apparatus to perform said storing of geographical location information by storing country identifications of countries within which IP addresses of said blocks reside, and community information assigned to said IP addresses.

21. The media of claim 18, wherein said programming instructions enable the apparatus to store said IP address assignment blocks into a plurality of prefix trees that are used to perform the searching for IP address assignment blocks.

22. The media of claim 18, wherein said programming instructions enable the apparatus to further compute the proximity measure for said first and second IP addresses by identifying geographical locations of said first and second IP addresses.

23. The media of claim 18, wherein said programming instructions enable the apparatus to collect AS numbers and IP addresses for the peers in the peer-to-peer network prior to the requestor peer requesting the resource.

24. An apparatus for locating peer providers of target resources comprising:
one or more storage media having stored thereon a plurality of programming instructions to enable said apparatus to operate as a peer participating in a peer-to-peer network in which peers publish resources originating therefrom, peers cache resources published by other peers and provide same to peers, and peers request resources from other peers, the instructions performing steps comprising:
collecting AS numbers and corresponding IP addresses for a plurality of peers in the peer-to-peer network, where the AS numbers are used by a gateway routing protocol, and storing, as AS/IP information, the AS numbers in association with the IP addresses such that the AS number of an IP address of a peer can be determined from the stored AS/IP information;
receiving an IP address of a peer requesting a target resource that is stored on the peer-to-peer network;
identifying a plurality of IP addresses of peers that are providing the target resource on the peer-to-peer network, the IP addresses being identified based on information indicating that the target resource is available on peers using the IP addresses;
searching the stored AS/IP information for the IP address of the requesting peer to find an AS number associated with said IP address of said requesting peer;

searching the stored AS/IP information for the IP addresses in the plurality of IP addresses to find AS numbers of the IP addresses in the plurality, respectively; and selecting one of the IP addresses in the identified plurality of IP addresses as an IP address from which to retrieve the target resource, where the one of the IP addresses is selected by computing measures of proximity between the IP address of the requesting peer and each of the IP addresses in the plurality, where the measure of proximity between the IP address of the requesting peer and any given IP address in the plurality is based on the found AS number of the requesting peer and the found AS number of the given IP address, where the one of the IP addresses is selected by comparing the measures of proximity; and at least one processor coupled to the storage medium to execute the programming instructions.

25. The apparatus of claim 24, wherein said programming instructions enable the apparatus to also obtain and store information mapping the IP addresses of the peers in the peer-to-peer network to the resources available on the peer-to-peer network, and using the mapping information to perform the identifying the plurality of IP addresses of the peers that are providing the target resource.

* * * * *

UNITED STATES PATENT AND TRADEMARK OFFICE
CERTIFICATE OF CORRECTION

| | | |
|---|---|---|
| PATENT NO. | : 7,720,996 B2 | Page 1 of 1 |
| APPLICATION NO. | : 09/908782 | |
| DATED | : May 18, 2010 | |
| INVENTOR(S) | : L. Roger Soles et al. | |

It is certified that error appears in the above-identified patent and that said Letters Patent is hereby corrected as shown below:

In cover page, item (54), under "Title" column 1, line 2, after "PROXIMITY" insert -- DETECTION --.

In column 1, line 2, after "PROXIMITY" insert -- DETECTION --.

Signed and Sealed this
Twenty-second Day of February, 2011

David J. Kappos
*Director of the United States Patent and Trademark Office*